(12) United States Patent
Dean, Jr. et al.

(10) Patent No.: US 9,618,704 B2
(45) Date of Patent: Apr. 11, 2017

(54) FIBER OPTIC CONNECTOR SUB-ASSEMBLIES HAVING A FRONT-LOADING LOCKING FERRULE HOLDER AND RELATED FIBER OPTIC COMPONENTS, DEVICES AND METHODS

(71) Applicant: CORNING OPTICAL COMMUNICATIONS LLC, Hickory, NC (US)

(72) Inventors: David Lee Dean, Jr., Hickory, NC (US); Michael de Jong, Colleyville, TX (US); Keith Ernest Hanford, Macedon, NY (US); Charles Todd Henke, Boyd, TX (US); Roger H. Jones, Mooresville, NC (US); Louis Edward Parkman, III, Richland Hills, TX (US); Thomas Theuerkorn, Hickory, NC (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/005,400

(22) Filed: Jan. 25, 2016

(65) Prior Publication Data
US 2016/0139343 A1 May 19, 2016

Related U.S. Application Data

(63) Continuation of application No. PCT/US2013/052968, filed on Jul. 31, 2013.

(51) Int. Cl.
*G02B 6/38* (2006.01)
*G02B 6/36* (2006.01)

(52) U.S. Cl.
CPC ......... *G02B 6/3869* (2013.01); *G02B 6/3821* (2013.01); *G02B 6/3891* (2013.01); *G02B 6/3851* (2013.01); *G02B 6/3871* (2013.01)

(58) Field of Classification Search
CPC .. G02B 6/3851; G02B 6/3869; G02B 6/3891; G02B 6/3821
(Continued)

(56) References Cited

U.S. PATENT DOCUMENTS 5,074,637 A * 12/1991 Rink .................... H01R 13/625
385/56
5,101,463 A 3/1992 Cubukciyan et al.
(Continued)

FOREIGN PATENT DOCUMENTS

EP 0390275 B1 11/1995
EP 2290416 A1 3/2011
(Continued)

OTHER PUBLICATIONS

Krone PremisNET, SC Connector Family for Multimode Fibers Technical Data Sheet, downloaded Jan. 22, 2016, 4 pages.
(Continued)

*Primary Examiner* — Robert Tavlykaev

(57) ABSTRACT

A fiber optic connector inner housing employing a front-loading retention feature for receiving and retaining a ferrule holder, and related fiber optic connectors, cables, and methods are disclosed. In one example, the inner housing has an opening extending therethrough and at least one bayonet locking mechanism that includes an insertion slot, a rotation slot, and a retention slot disposed in an interior surface of the opening. A ferrule holder having a key portion is inserted into the opening such that the key portion is received by the insertion slot. The ferrule holder is next rotated in the rotation slot and released such that a bias member within the inner housing moves the key portion of the ferrule holder into the retention slot, thereby retaining the ferrule holder in the inner housing and preventing accidental removal of the ferrule holder from the inner housing.

20 Claims, 10 Drawing Sheets

(58) Field of Classification Search
USPC .................................. 385/56, 58, 60, 72, 78
See application file for complete search history.

(56) References Cited

U.S. PATENT DOCUMENTS

| | | | | |
|---|---|---|---|---|
| 5,170,452 | A * | 12/1992 | Ott | G02B 6/3847 385/56 |
| 5,751,875 | A * | 5/1998 | Edwards | G02B 6/3865 385/76 |
| 5,971,626 | A | 10/1999 | Knodell et al. | |
| 6,334,715 | B1 * | 1/2002 | So | G02B 6/3825 385/139 |
| 6,705,766 | B2 | 3/2004 | Lecomte et al. | |
| 7,553,177 | B2 * | 6/2009 | Antonini | H01R 13/641 439/314 |
| 7,905,742 | B2 * | 3/2011 | Wollitzer | H01R 13/625 439/157 |
| 8,858,090 | B2 | 10/2014 | Henke et al. | |
| 2003/0138217 | A1 | 7/2003 | Lecomte et al. | |
| 2008/0050070 | A1 | 2/2008 | Gurreri et al. | |
| 2011/0075972 | A1 | 3/2011 | Parkman, III | |
| 2012/0020618 | A1 | 1/2012 | Erdman et al. | |
| 2013/0161941 | A1 * | 6/2013 | Zulauf | F16L 21/08 285/80 |
| 2013/0161946 | A1 * | 6/2013 | Baumgartner | B60R 21/2171 285/402 |
| 2013/0230284 | A1 * | 9/2013 | Tamekuni | G02B 6/3846 385/78 |
| 2014/0032560 | A1 | 1/2014 | Reese | |
| 2014/0050446 | A1 | 2/2014 | Chang | |

FOREIGN PATENT DOCUMENTS

| | | |
|---|---|---|
| JP | 61262709 A | 11/1986 |
| JP | 3825930 B2 | 9/2006 |
| WO | 9015350 A1 | 12/1990 |
| WO | 2006069093 A1 | 6/2006 |

OTHER PUBLICATIONS

International Search Report; PCT/US2013/052968; Mailed Feb. 5, 2015.

* cited by examiner

FIBER OPTIC CONNECTOR SUB-ASSEMBLIES HAVING A FRONT-LOADING LOCKING FERRULE HOLDER AND RELATED FIBER OPTIC COMPONENTS, DEVICES AND METHODS

PRIORITY APPLICATION

This application is a continuation of International Application No. PCT/US13/52968, filed on Jul. 31, 2013, the content of which is relied upon and incorporated herein by reference in its entirety.

BACKGROUND

The disclosure relates generally to fiber optic connector sub-assemblies, and more particularly to a fiber optic connector sub-assembly that includes a front-loading locking ferrule holder, which may be used in assembly of fiber optic connectors. Related components, devices and methods are also disclosed.

Benefits of utilizing optical fiber include extremely wide bandwidth and low noise operation. Because of these advantages, optical fiber is increasingly being used for a variety of applications, including but not limited to broadband voice, video, and data transmission in communications networks. As a result, communications networks include a number of optical interconnection points in fiber optic equipment and between fiber optic cables in which optical fibers must be interconnected via fiber optic connections. To conveniently provide these fiber optic connections, fiber optic connectors are provided. A fiber optic connector includes a housing that provides internal components for receiving, supporting, protecting, and aligning one or more end portions of optical fibers exposed from a fiber optic cable(s) when mated with other fiber optic connectors or adapters provided in fiber optic equipment or fiber optic cables. Fiber optic connectors may be installed on fiber optic cables in the field. Alternatively, fiber optic cables may be "pre-connectorized" during the manufacturing of the fiber optic cables.

In this regard, a fiber optic connector typically employs a fiber optic connector sub-assembly having a plurality of components. For example, FIG. 1 shows a view of an exemplary fiber optic connector sub-assembly 10 for a conventional SC-type connector. The connector sub-assembly 10 is assembled by inserting a ferrule holder 12 having a ferrule 14 mounted thereon into a rear opening 16 of an inner housing 18. The ferrule 14 extends through the inner housing 18 to a front opening (not shown) of the inner housing 18. A spring 20 is then disposed around the end of the ferrule holder 12 and a crimp body 22 is inserted into the rear opening 16 of the inner housing 18 around the ferrule holder 12 and spring 20. The crimp body 22 has a plurality of radial teeth 24 that align with grooves 26 within the rear opening 16 of the inner housing 18, and a snap fit flange 28 that securely mates with a complementary snap fit feature (not shown) within the inner housing 18. An unterminated fiber optic cable 30 can then be passed through the crimp body 22 to be mated with the ferrule holder 12 for final assembly of the connectorized optical cable.

These and other methods of assembling fiber optic cable connectors include a number of mechanical steps and typically may include manual labor. The influence of manual labor in the assembly process provides cost, affects consistency, and can decrease throughput in processing fiber optic connector terminations. Automated fiber optic connector termination processes for fiber optic cable preparations have been employed to reduce manual labor influence, but at significant capital costs. Even so, these automated fiber optic connector termination processes may not be flexible with respect to terminating varieties of fiber optic connectors or fiber optic cable types. Further, with these fiber optic connector termination processes, if one fiber optic connector termination fails, it must be reworked or the entire fiber optic cable must scrapped. In either case, the fiber optic cable assembly can be delayed, thereby disrupting fiber optic cable assembly throughput and increasing scrapped fiber optic cables, increasing costs as a result.

No admission is made that any reference cited herein constitutes prior art. Applicant expressly reserves the right to challenge the accuracy and pertinency of any cited documents.

SUMMARY

Embodiments disclosed herein include fiber optic connector inner housing employing a front-loading retention feature for receiving and retaining a ferrule holder. Related fiber optic connectors, cables, and methods are also disclosed. In one embodiment, inner housing includes an inner housing having an opening extending therethrough. An interior surface of the opening includes a bayonet locking mechanism having an insertion slot, a rotation slot, and a retention slot, and a bias member mounting portion for mounting a bias member. A ferrule holder having a key portion is inserted into the opening such that the key portion is received by the insertion slot and the bias member is disposed between the ferrule holder and the bias member mounting portion. The ferrule holder is next rotated such that the key portion rotates within the rotation slot. The ferrule holder is then released such that the bias member moves the key portion of the ferrule holder into the retention slot, thereby retaining the ferrule holder in the inner housing and preventing accidental removal of the ferrule holder from the inner housing. This arrangement simplifies assembly of a fiber optic connector sub-assembly and provides secure retention of the ferrule holder within the inner housing.

One embodiment of the disclosure relates to a fiber optic connector inner housing for mounting and retaining a ferrule holder as part of a fiber optic connector sub-assembly. The inner housing includes an inner housing having an opening extending therethrough, wherein the opening comprises a front end, a rear end, and an interior surface. The inner housing further includes at least one bayonet locking mechanism. Each bayonet locking mechanism comprises an insertion slot disposed in the interior surface of the opening configured to receive a respective key portion of a ferrule holder when the ferrule holder is inserted into the front end of the opening. Each bayonet locking mechanism further comprises a rotation slot disposed in the interior surface of the opening for rotating the key portion of the ferrule holder away from the insertion slot. Each bayonet locking mechanism further comprises a retention slot disposed in the interior surface of the opening for retaining the ferrule holder in the inner housing.

An additional embodiment of the disclosure relates to a fiber optic connector sub-assembly. The fiber optic connector sub-assembly includes an inner housing comprising an inner housing having an opening extending therethrough, wherein the opening comprises a front end, a rear end, and an interior surface. The inner housing also includes at least one bayonet locking mechanism comprising an insertion slot disposed in the interior surface of the opening, a rotation slot disposed in the interior surface of the opening, and a retention slot disposed in the interior surface of the opening. The fiber optic connector sub-assembly further includes a bias member mounting portion disposed at the rear end of the opening, a ferrule holder having a key portion disposed in the inner housing, and a bias member disposed in the inner housing between the ferrule holder and the bias member mounting portion. The insertion slot is configured to receive the key portion of the ferrule holder when the ferrule holder is inserted into the opening. The rotation slot is configured to allow the ferrule holder to be rotated away from the insertion slot. The bias member is configured to move the key portion of the ferrule holder into the retention slot when the ferrule holder is released, thereby retaining the ferrule holder in the inner housing.

An additional embodiment of the disclosure relates to a method of assembling a fiber optic connector sub-assembly. The method comprises providing an inner housing comprising an inner housing having an opening extending therethrough, wherein the opening comprises a front end, a rear end, and an interior surface. The inner housing further includes at least one bayonet locking mechanism comprising an insertion slot disposed in the interior surface of the opening, a rotation slot disposed in the interior surface of the opening, and a retention slot disposed in the interior surface of the opening. The inner housing further includes a bias member mounting portion disposed at the rear end of the opening. The method further includes providing a bias member in the inner housing adjacent the bias member mounting portion. The method further includes inserting the ferrule holder into the front end of the opening of the inner housing such that the key portion is received by the insertion slot and the bias member is disposed between the ferrule holder and the bias member mounting portion. The method further includes rotating the ferrule holder about a longitudinal axis of the opening such that the key portion rotates within the rotation slot. The method further includes releasing the ferrule holder such that the bias member moves the key portion of the ferrule holder into the retention slot, thereby retaining the ferrule holder in the inner housing.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
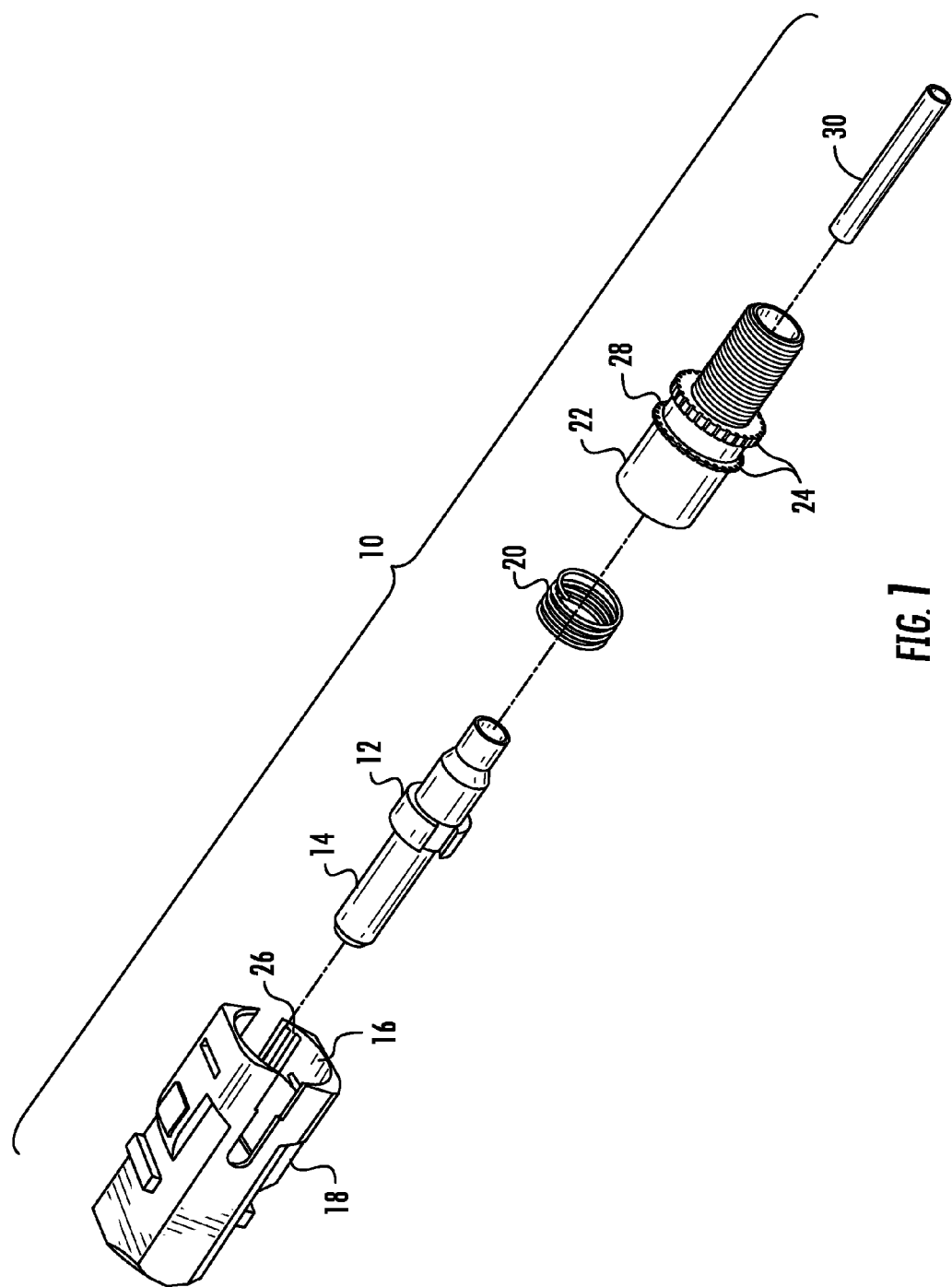
FIG. 1 is an exploded isometric view of a fiber optic connector sub-assembly having a rear loading ferrule holder according to the prior art.
Figure 2:
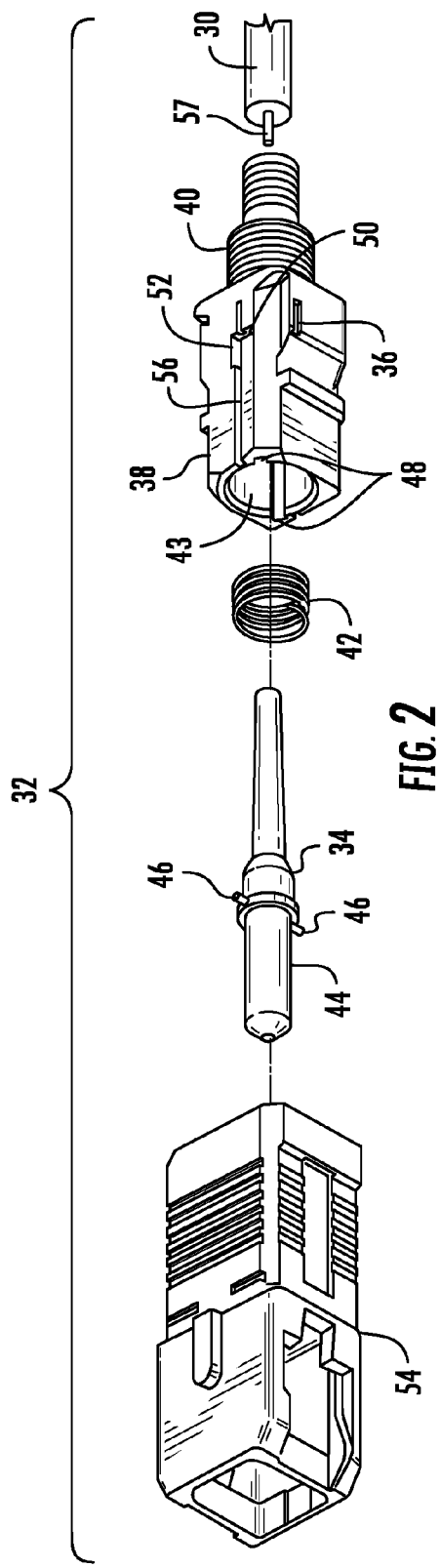
FIG. 2 is an exploded isometric view of an exemplary fiber optic connector sub-assembly having a front-loading ferrule holder according to an embodiment.

Various embodiments will be further clarified by the following examples. In this regard, FIG. 2 is an exploded isometric view of an exemplary fiber optic connector sub-assembly 32 having a front-loading ferrule holder 34 according to an embodiment. An inner housing sub-assembly 36 includes an inner housing 38 and crimp body 40 assembled and/or integrally formed as one piece. A spring 42 or other bias member is inserted into a front opening 43 of the inner housing sub-assembly 36 and a ferrule holder 34 having a ferrule 44 mounted thereon is inserted into the front opening 43 of the inner housing sub-assembly 36 through the spring 42. In this example, the ferrule holder 34 has a pair of key portions 46 that align with complementary insertion slots 48 in an interior surface of the inner housing 38 to permit insertion of the ferrule holder 34 into the front opening of the inner housing 38. As will be shown in greater detail in FIGS. 3A and 3B, each insertion slot 48 is part of a bayonet locking mechanism that allows the complementary key portion 46 of the ferrule holder 34 to be inserted into the insertion slot 48, rotated in a rotation slot 50 and retained in a retention slot 52. After the key portions 46 are locked into their complementary retention slots the key portions 46 are retained in the retention slots 52 by the bias force of the spring 42 pressing against the ferrule holder 34. In addition, as will be discussed below with respect to FIGS. 5A and 5B, the key portions 46 can be further retained the retention slots 52 in this embodiment by complementary locking flanges (not shown) on an interior surface of a shroud 54 that mate with respective locking slots 56 on an outer surface of the inner housing 38. In this manner, a number of retention mechanisms can be employed to permanently secure and retain the key portions 46 within their respective retention slots 52, thereby securely retaining the ferrule holder 34 within the inner housing 38. An optical fiber 57 extending from fiber optic cable 30 may be passed through the rear end of the ferrule holder 34 and connected to the ferrule 44 using conventional techniques.

Figure 3:
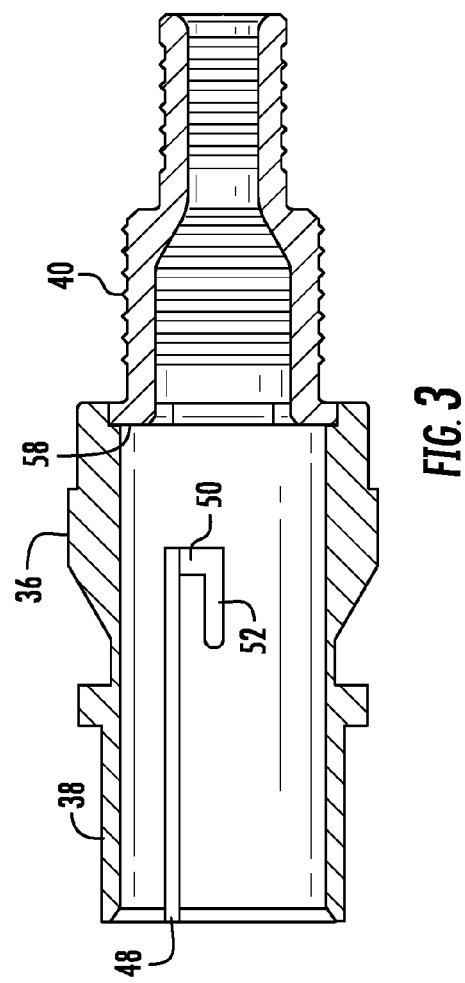
FIG. 3 is a cross-sectional side view of the inner housing sub-assembly of FIG. 2 showing a bayonet locking mechanism for receiving and retaining the front-loading ferrule holder.

In this regard, FIG. 3 is a cross-sectional side view of the inner housing sub-assembly 36 including a detailed view of the bayonet locking mechanism of the inner housing sub-assembly 36. As described above with regard to FIG. 2, the spring 42 is inserted into the front opening 43 of inner housing 38. The crimp body 40 is connected to the inner housing 38 at the rear end of opening 43, and a stepped surface of the crimp body 40 forms a bias member mounting portion 58 in this embodiment, which is abutted by the inserted spring 42. In another embodiment, an alternative bias member mounting portion (not shown) can be formed in the inner housing 38 instead of on the crimp body 40.

FIG. 3 also illustrates how structural integrity and bend resistance of the inner housing can be maintained when including a bayonet mechanism according to different embodiments disclosed herein. For example, fiber optic inner housings are commonly formed from a moldable material such as thermoplastic. Accordingly, the limitations of molding techniques may determine the types of unitary shapes that can be produced. It is possible to form the straight insertion slot 48 as a groove along the longitudinal axis of the inner housing 38 that does not completely pass through the wall of the inner housing 38 because a mold pin configured to produce such a groove can be removed from the inner housing sub-assembly 36 in a longitudinal direction without damaging the inner housing 38. However, conventional molding techniques do not permit forming the rotation channel 50 and retention slot 52 in this manner, because the mold pin could not then be removed from the inner housing 38 without damaging the inner housing 38. Instead, conventional molding techniques require either a flange in an inner surface of the mold to contact the mold pin, thereby creating an aperture through the inner housing 38, or a subsequent coring out of an aperture to form the rotation slot 50 and retention slot 52 after the molding process. Thus, at least a portion of the rotation slot 50 and a portion of the retention slot 52 extends from the interior surface of the inner housing 38 through an outer surface of the inner housing 38 in this embodiment. As can be seen from FIG. 3, the rotation slot 50 and retention slot 52 are comparatively small in relation to the overall inner housing 38. Accordingly, it can be seen in this and other embodiments that the relative size of the rotation slot 50 and retention slot 52 can be designed so as to optimize the structural integrity and bend resistance of the inner housing 38.

Figure 4A:
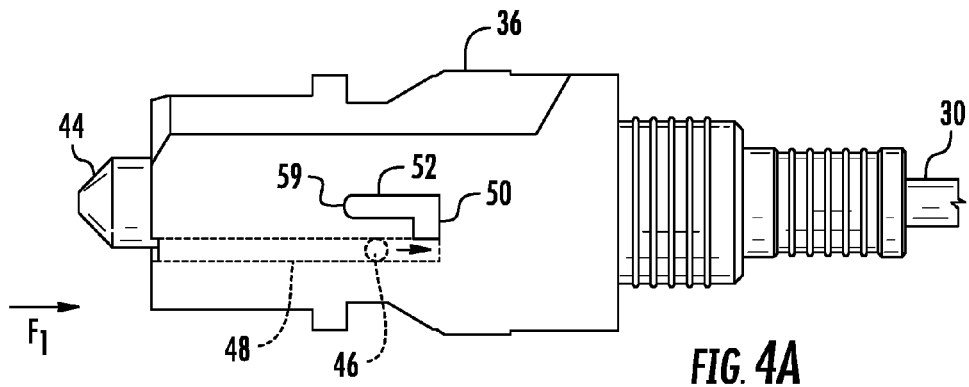
FIG. 4A-4C are side views of the inner housing sub-assembly of FIG. 2 showing insertion and retention of a ferrule holder within the inner housing sub-assembly.
Figure 4B:
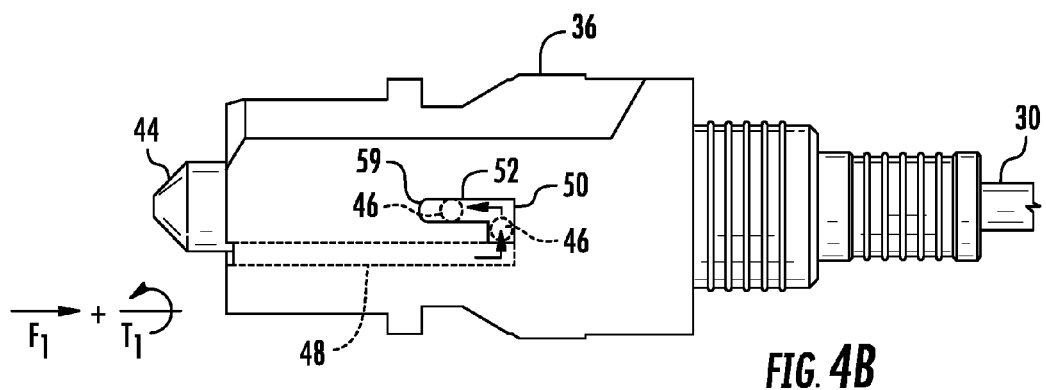
Figure 4C:
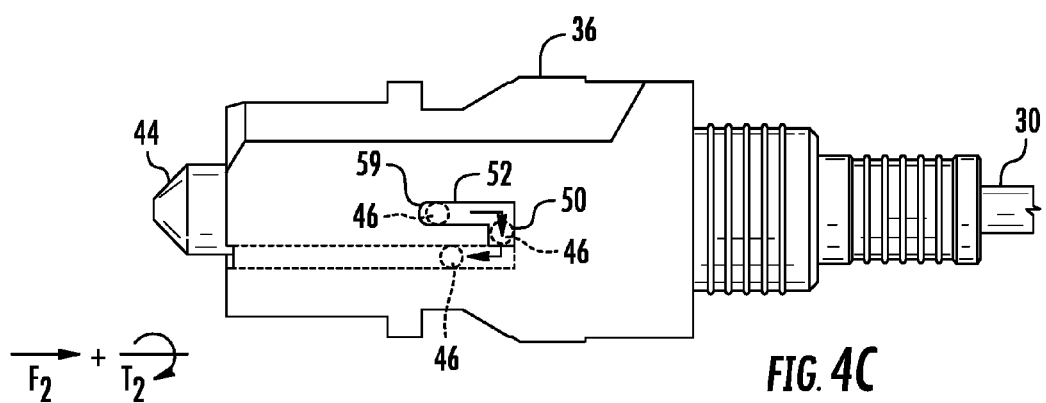

To illustrate insertion and retention of the ferrule holder 34 within the inner housing sub-assembly 36, FIG. 4A-4C illustrate exemplary steps for inserting and retaining the ferrule holder 34. After the spring 42 is disposed in the inner housing 38 to abut the bias member mounting portion 58, FIG. 4A shows the ferrule holder 34 being inserted into the front opening 43 of the inner housing 38 using an insertion force $F_1$ parallel to a longitudinal axis of the fiber optic inner housing sub-assembly 36. In this embodiment, the key portions 46 of the ferrule holder 34 are protrusions that slidably engage the insertion slot 48 of the inner housing 38 during insertion.

After the ferrule holder 34 has been fully inserted, as shown in FIG. 4B, the rotation slot 50 permits each key portion 46 to rotate with respect to a longitudinal axis of the fiber optic connector, thereby permitting the entire ferrule holder 34 to be rotated about the longitudinal axis. In this embodiment, the initial rotation of the key portion 46 into the rotation slot 50 requires application of a rotational force $T_1$ in combination with maintaining the original insertion force $F_1$, to counteract the compression of the spring 42 (not shown). After the ferrule holder 34 has been rotated, the retention slot 52 permits the ferrule holder 34 to move back toward the front opening 43 of the inner housing 38 by the spring 42. In this manner, a ferrule holder 34 can be inserted and retained in the inner housing sub-assembly 36 by a simple, two-step motion.

As can be seen from FIGS. 4A-4C, the insertion slots 48, rotation slots 50, and retention slots 52 are configured to slidably accommodate the key portions 46. The retention slots 52 permit the key portions 46 to freely move longitudinally forward and backward, while providing a stop 59 at the front end of the retention slots 52 to prevent removal of the ferrule holder 34 and to properly align the ferrule 44 within predetermined tolerances with respect to the connector assembly. In addition, the key portions 46 are located away from the longitudinal axis of the ferule holder 34. This arrangement creates a longer moment arm for the key portions 46, such that rotation of the ferule holder 34 about the longitudinal axis permits greater control of the rotation of the key portions 46 and/or permits greater manufacturing tolerances for the key portions 46 and rotations slots 50.

To prevent accidental removal of the ferrule holder 34 via the rotation slots 50, spring 42 also keeps the ferrule holder 34 biased forward toward the opening 43 such that the ferrule holder 34 cannot be removed from the inner housing 38 without simultaneously applying an insertion and rotation force to the ferrule holder. In this manner, the ferrule holder 34 is thus also prevented from being accidentally or unintentionally removed from the inner housing sub-assembly 36.

Figure 5A:
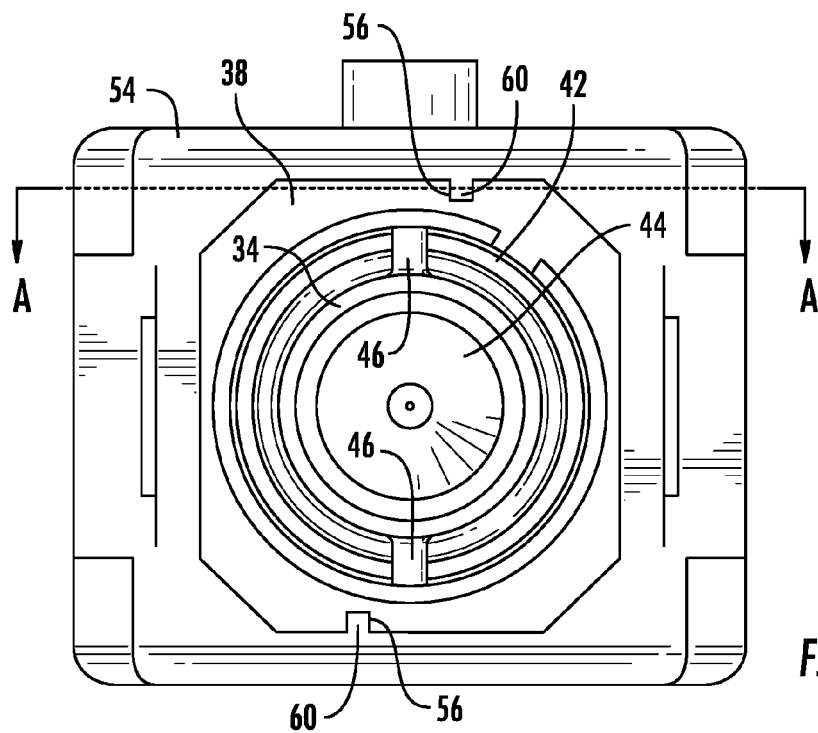
FIGS. 5A and 5B are respective front and top cutaway views of an exemplary assembled fiber optic connector sub-assembly showing a locking mechanism for the fiber optic connector sub-assembly according to an alternative embodiment.
Figure 5B:
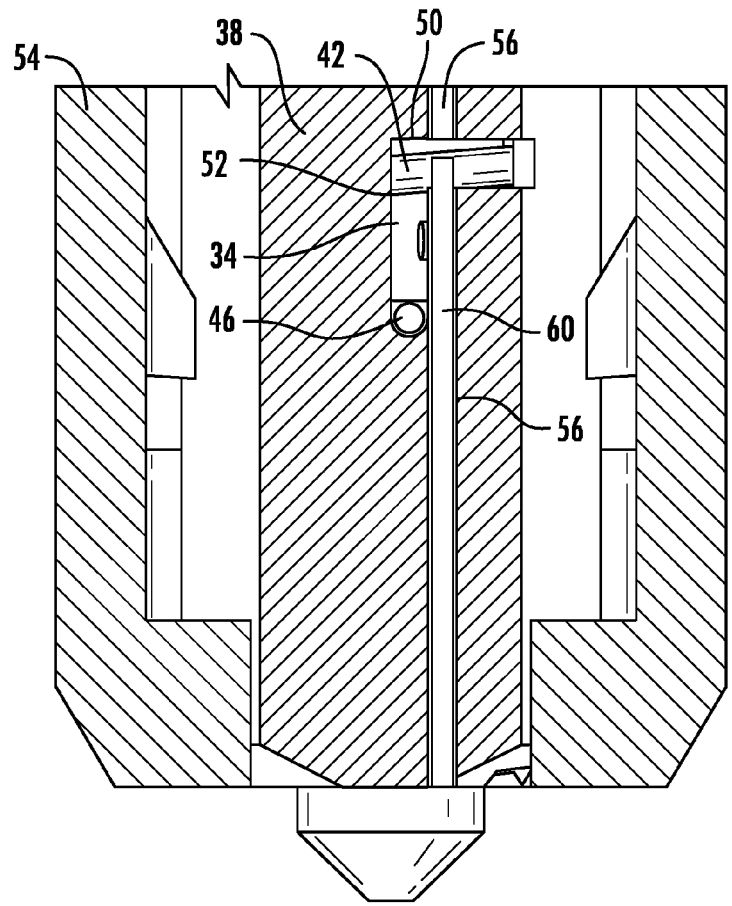

Additional features may also be included to prevent removal of the ferrule holder 34 from the inner housing 38 after the key portions 46 have been retained by the retention slots 52. For example, a locking mechanism may be employed to physically obstruct the rotation slots 50 after the key portions 46 have been retained by the retention slots 52. In this regard, FIGS. 5A and 5B are respective front and top cutaway views of an exemplary assembled fiber optic connector sub-assembly of FIG. 2. As discussed above with respect to FIG. 2, the inner housing may include retention slots 52 on an outer surface of the inner housing 38. As shown in FIGS. 5A and 5B, complementary locking flanges 60 disposed on the interior surface of the shroud 54 are configured to slidably mate with the locking slots 56 when the inner housing sub-assembly 36 is inserted into the shroud 54. As shown in FIG. 5B, each locking slot 56 is adjacent to the retention slot 52 and passes through the rotation slot 50. Thus, when the locking flanges 60 are mated with the locking slots 56, each locking flange 60 physically blocks a portion of the rotation slot 50, thereby preventing the key portion 46 disposed in the retention slot 52 from being rotated out of the retention slot 52. In many embodiments, the shroud 54 may be configured to be permanently attached to the inner housing sub-assembly 36, for example through a one-way snap-fit or other conventional attachment mechanism. Thus, in this embodiment, the locking flange 60 of the shroud 54 effectively forms a permanent side wall for the retention slot 52 when the inner housing sub-assembly 36 is permanently mounted within the shroud 54.

Figure 6A:
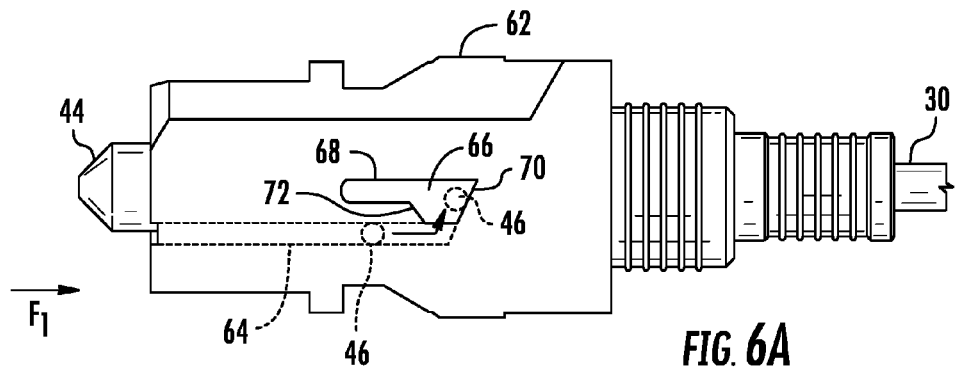
FIG. 6A-6D are side views of an inner housing sub-assembly according to an alternative embodiment showing insertion and retention of a ferrule holder within the inner housing sub-assembly employing a ramp feature for automatically rotating and retaining the ferrule holder in the inner housing, including detail views of the bayonet mechanism of the inner housing sub-assembly illustrating a prescribed displacement assembly system.
Figure 6B:
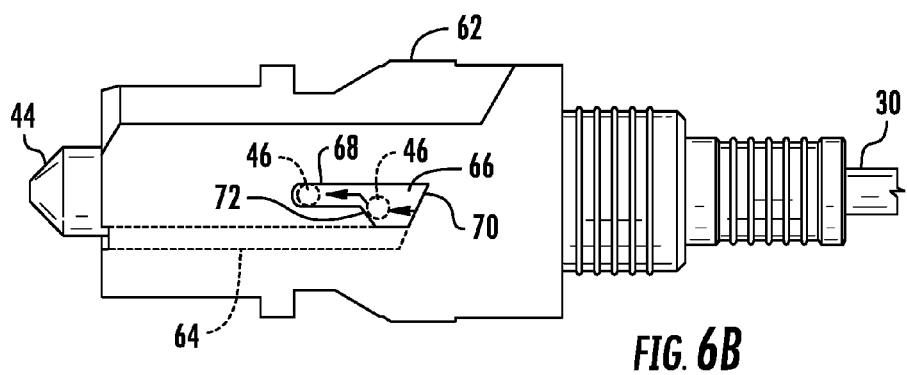

Additional features for retaining the key portion 46 in the retention slot 52 of a bayonet locking mechanism may also be employed. In this regard, FIGS. 6A and 6B are side views of an exemplary inner housing sub-assembly 62 for a fiber optic connector sub-assembly showing a ramp feature for automatically rotating and retaining a ferrule holder having key portions 46 in the inner housing sub-assembly 62. In this example, an alternative bayonet locking mechanism includes an insertion slot 64, a rotation slot 66, and a retention slot 68. However, the rotation slot 66 in this example has a trapezoidal profile including a first ramp surface 70 for guiding a key portion 46 away from insertion slot 64 during insertion of the ferrule holder 34 (not shown), and a second ramp surface 72 for blocking and guiding the key portion 46 away from the insertion slot 64 and toward the retention slot 68 when the ferrule holder 34 is released. One advantage of this arrangement is that insertion and rotation of the ferrule holder 34 can be accomplished by a single longitudinal insertion force $F_1$ that does not include an external torque component. FIG. 6A illustrates how continued application of insertion force $F_1$ causes the key portion 46 to engage the first ramp surface 70 of the rotation slot 66 and automatically rotate as the key portion 46 travels further in the longitudinal direction. As shown by FIG. 6B, the second ramp surface 72 causes a similar rotation toward the retention slot 68 as the spring 42 applies a bias force (i.e., counterforce) in the opposite longitudinal direction when the insertion force is released. One advantage of this arrangement is that it simplifies both manual and automated assembly by requiring a simple, one dimensional force to be applied to the ferrule holder 34.

In addition, the precision of the insertion force $F_1$ can be varied in this arrangement, because the key portion 46 does not need to be fully rotated in the rotation slot 66 prior to releasing the insertion force. For example, so long as the key portion 46 is rotated out of the insertion slot 64, the second ramp surface 72 will prevent the counterforce from the spring 42 (not shown) from moving the key portion back into the insertion slot 64. Instead, the counterforce from the spring 42 will cause the key portion 46 to be rotated toward and into the retention slot 68 automatically by the second ramp surface 72. Thus, in an automated process, the precise amount of insertion force to be applied to the ferrule holder 34 can have a relatively large tolerance (i.e., manufacturing window). Likewise, in a manual process, the small amount of time saved by a simplified, one-action insertion assembly process may produce substantial savings in aggregate time and labor costs.

Figure 6C:
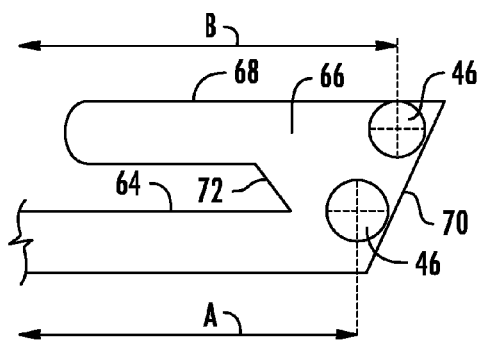
Figure 6D:
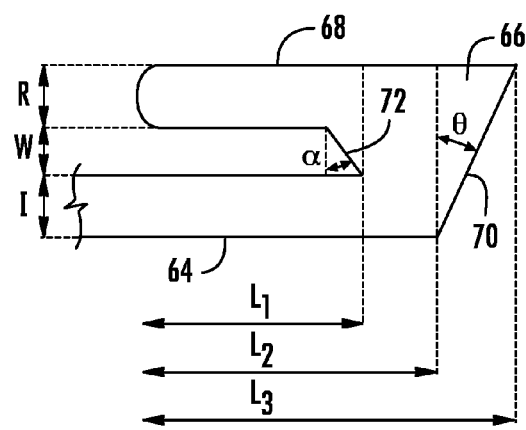

This arrangement also permits a "prescribed displacement" system to be used, for example, to design assembly tools having appropriate tolerances. In this regard, FIGS. 6C and 6D are simplified detail views of the bayonet mechanism of FIGS. 6A and 6B with additional dimensions that may be used for determining acceptable tolerances for assembly tools. FIG. 6C illustrates a first length A representative of a minimum allowable insertion distance for key feature 46, i.e., the distance beyond which the key feature 46 will contact the second ramp surface when the insertion tool is released, thereby biasing the key feature toward and into the retention slot. FIG. 6C also illustrates a second length B representative of a maximum allowable insertion distance for key feature 46, i.e., the vertex between the first ramp surface 70 and the wall of retention slot 68. Thus, an appropriate insertion tool for this design should have a length $L_T$ equal to the average of A and B plus or minus an acceptable tolerance of half the difference of B and A. This relationship is represented by Equation 1 below:

$$L_T = \frac{(B+A)}{2} \pm \frac{(B-A)}{2} \qquad \text{Equation 1}$$

To aid in designing for specific values of A and B, FIG. 6D illustrates a number of dimensions of the bayonet mechanism. In this regard, the three illustrated lengths $L_1$-$L_3$ correspond to the length of the insertion slot 64 measured from different points in the bayonet mechanism. $L_1$ corresponds to the length of the insertion slot 64 measured from the vertex of the insertion slot 64 and second ramp surface 72. $L_2$ corresponds to the length of the insertion slot 64 measured from the vertex of the insertion slot 64 and first ramp surface 72. $L_3$ corresponds to the length of the insertion slot 64 and rotation slot 66 measured from the vertex of the rotation slot 66 and second ramp surface 72. FIG. 6D also illustrates angle θ corresponding to the angle of the first ramp surface 70, and angle α corresponding to the angle of second ramp surface 72. Finally, FIG. 6D illustrates a width I of insertion slot 64, width R of retention slot 68 (equal to width I in this embodiment), and intermediate width W therebetween. These dimensions permit an appropriate prescribed displacement design calculation to be performed.

For example, to determine an appropriate manufacturing tool length tolerance to form the first ramp surface 70 for the bayonet mechanism of FIGS. 6A-6D, the threshold longitudinal distance $T_y$ traveled by the key portion within the rotation slot 66 must be determined. This distance $T_y$ is equal to (B-A), which corresponds the longitudinal translation of the center of the key feature 46 from the point at which the center of the key feature rotates out of the insertion slot 64 (at distance A) to the point at which the key feature 46 abuts the far wall of the rotation slot 66 and the first ramp surface 70 (at distance B). Because the diameter of the key feature 46 is equal to width R in this embodiment, the distance (B-A) can be also be represented by equation 2 below.

$$T_y = (B-A) = \left(\frac{1}{2}R + W\right)\tan\theta \qquad \text{Equation 2}$$

Combining Equation 2 with Equation 1 yields the following calculation for determining $L_T$ may be represented by equation 2 below.

$$L_T = \frac{(B+A)}{2} \pm \left(\frac{1}{2}R + W\right)\tan\theta \qquad \text{Equation 3}$$

Thus, as shown above, a prescribed displacement system can be used with this and other embodiments to design assembly tools that achieve reliable assembly during manufacturing while allowing for maximum allowable tolerances to keep overall manufacturing costs down.

Figure 7A:
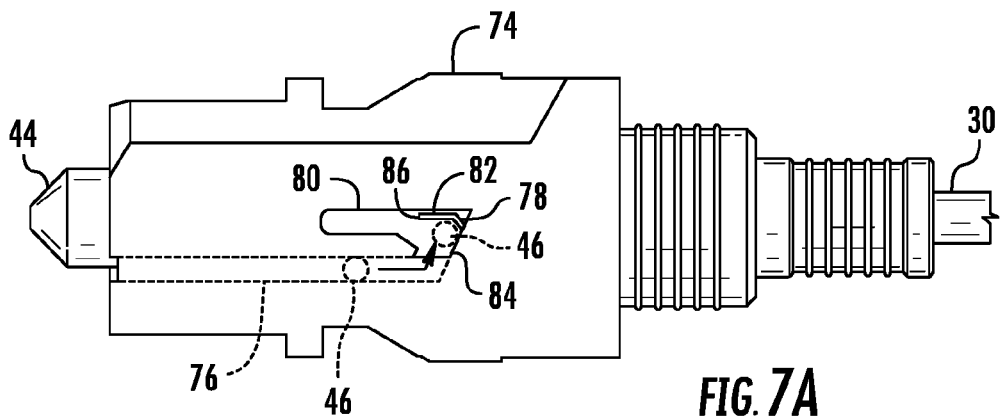
FIG. 7A-7C are side views of an inner housing sub-assembly according to an alternative embodiment showing insertion and retention of a ferrule holder within the inner housing sub-assembly employing a latch feature for automatically locking and retaining the ferrule holder in the inner housing.
Figure 7B:
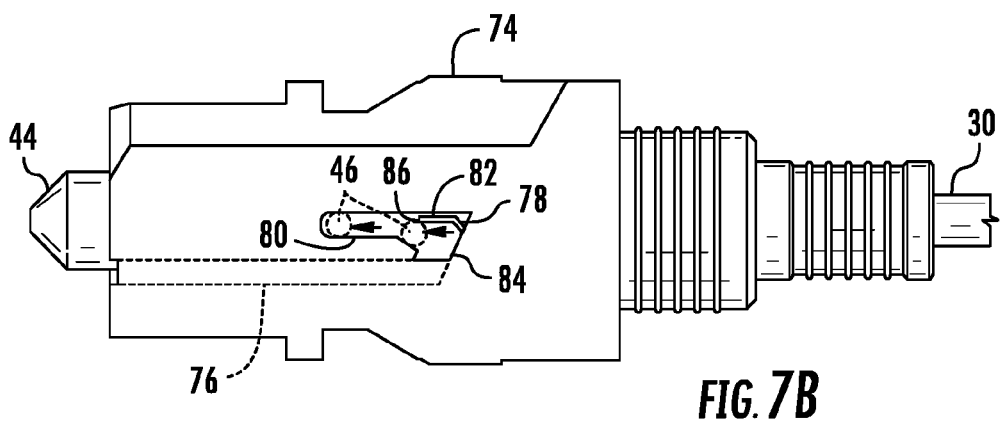
Figure 7C:
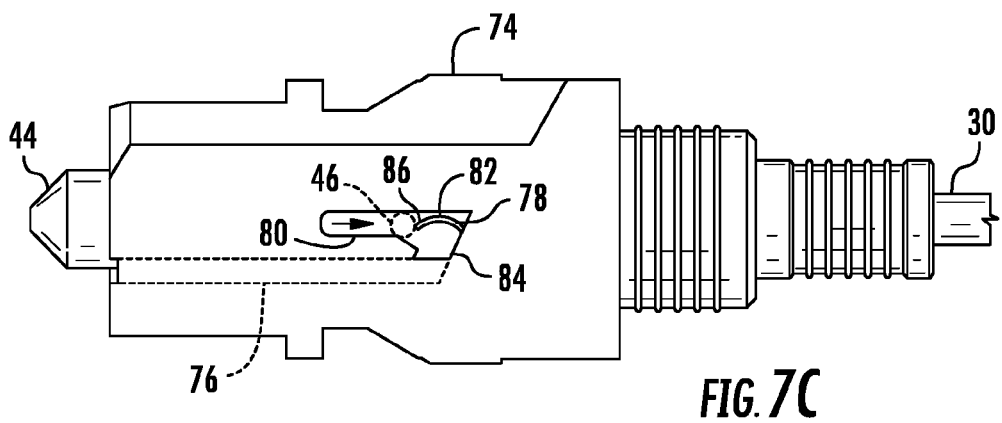

The bayonet locking mechanism may include additional structures for preventing removal of the ferrule holder 34 as well. In this regard, FIGS. 7A-7C are side views of an exemplary inner housing sub-assembly 74 for a fiber optic connector sub-assembly showing a latch feature for automatically locking and retaining the ferrule holder in the inner housing. As shown in FIG. 7A, the rotation slot 78 includes a one-way flexible latch structure 82 that extends towards and partially obstructs the retention slot 80. FIG. 7B illustrates that the latch structure 82 is bendable about the first ramp surface 84 such that the latch structure 82 is pushed aside by the key portion 46 when the key portion 46 is being guided into the retention slot 80. However, once the key portion 46 is retained in the retention slot 80, the latch structure 82 blocks and obstructs the key portion 46. If an attempt is made to move the key portion 46 back into the rotation slot 78, as shown in FIG. 7C, the key portion 46 will engage a free end 86 of the latch structure 82 such that the latch structure 82 impedes movement of the key portion 46 and may also resiliently deform to further block the rotation slot 78.

Advantageously, and as shown in FIGS. 7A-7C, the latch structure 82 may designed as with first and second substantially straight sections separated by a bend. This configuration allows for a latch structure with a longer length, which helps distribute loads.

Figure 8A:
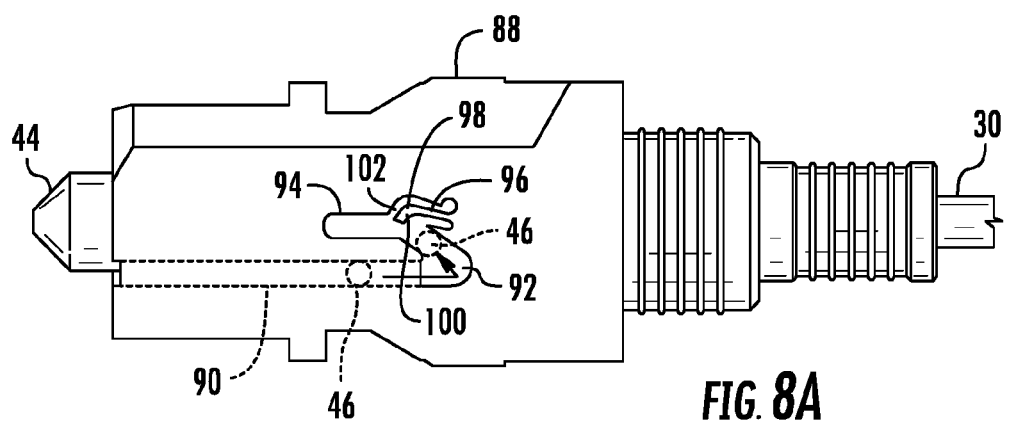
FIG. 8A-8C are side views of an inner housing sub-assembly according to an alternative embodiment showing insertion and retention of a ferrule holder within the inner housing sub-assembly employing an alternative latch feature for automatically locking and retaining the ferrule holder in the inner housing.
Figure 8B:
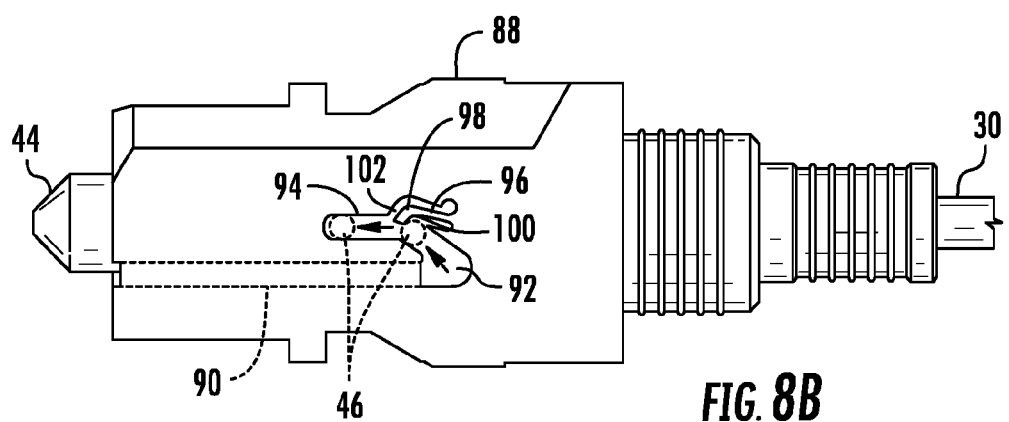
Figure 8C:
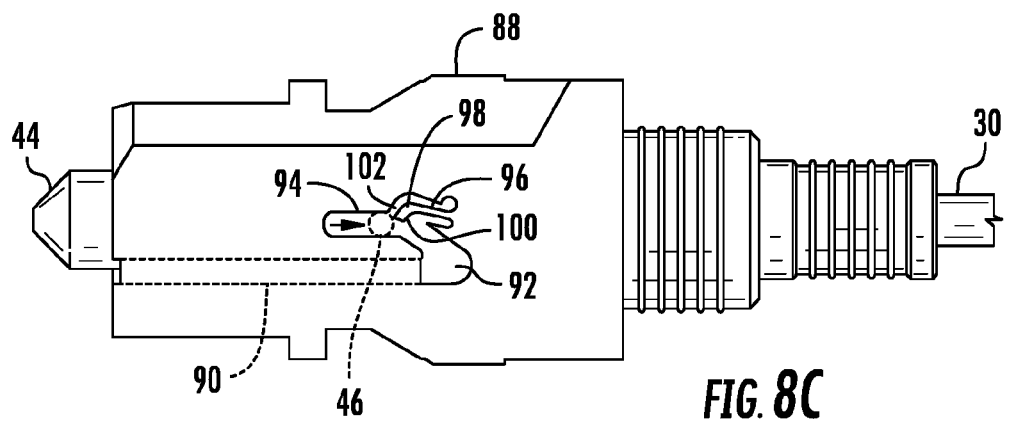

Another alternative fiber optic inner housing sub-assembly 88 is disclosed in FIGS. 8A-8C. In this embodiment, as shown by FIG. 8A, the fiber optic inner housing sub-assembly 88 includes a bayonet locking mechanism including an insertion slot 90, a rotation slot 92, and a retention slot 94 for accommodating a ferrule holder, such as ferrule holder 34 having key portions 46 and carrying ferrule 44. The rotation slot 92 has an irregular curved profile to facilitate movement of key portion 46 into the retention slot 94. A latch structure 96 also includes a ramped flange 98 in this embodiment. As shown by FIG. 8B, the ramped flange 98 has a first ramp surface 100 facing the rotation slot 92 that facilitates movement of the key portion 46 from the rotation slot 92 by moving the latch feature away from the rotation slot 92 when the key portion 46 engages the first ramp surface 100. The ramped flange 98 also has a second ramp surface 102 facing the retention slot 94. As shown by FIG. 8C, the second ramp surface 102 prevents removal of the key portion 46 from the retention slot 94 by moving the latch feature further into the rotation slot 92 when the key portion 46 engages the second ramp surface 102, thereby preventing removal of the key portion 46 from the retention slot 94.

Figure 9A:
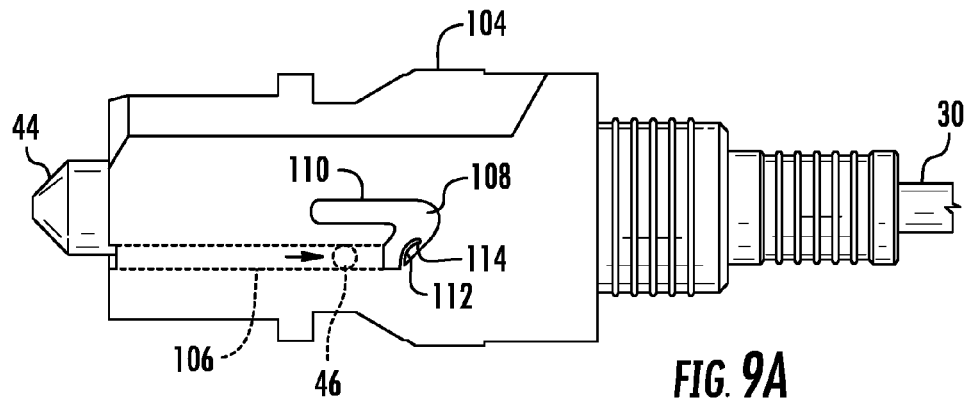
FIG. 9A-9C are side views of an inner housing sub-assembly according to an alternative embodiment showing insertion and retention of a ferrule holder within the inner housing sub-assembly employing an alternative latch feature for automatically locking and retaining the ferrule holder in the inner housing.
Figure 9B:
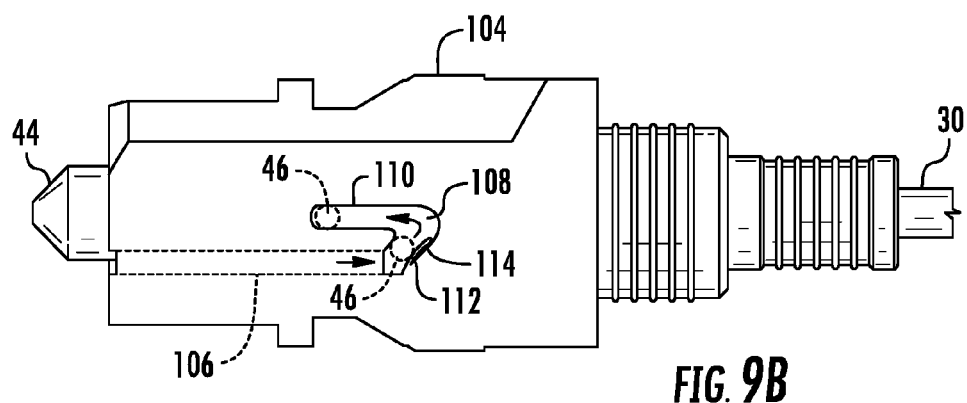
Figure 9C:
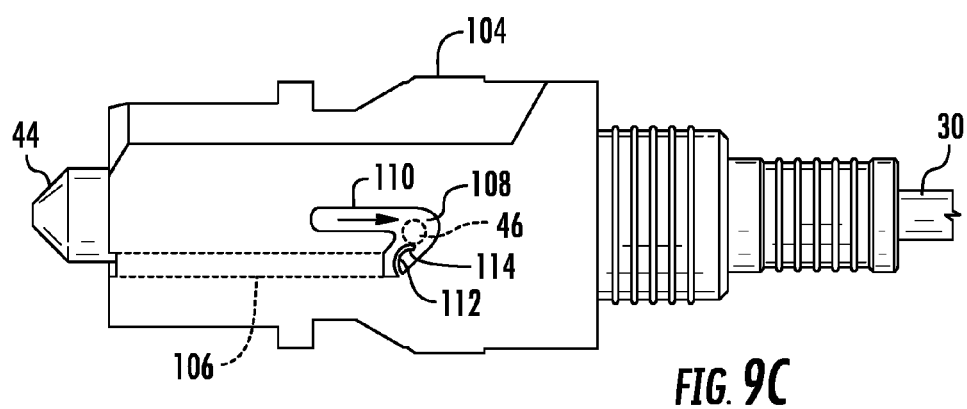

FIGS. 9A-9C show another fiber optic inner housing sub-assembly 104 that includes a bayonet locking mechanism including an insertion slot 106, a rotation slot 108, and a retention slot 110 for accommodating a ferrule holder, such as ferrule holder 34 having key portions 46 and carrying ferrule 44. As shown in FIG. 9A, a latch structure 112 disposed in the rotation slot 108 comprises a leaf spring (e.g., has a leaf spring profile). As shown in FIG. 9B, insertion of the key portion 46 causes the latch structure 112 to flatten out within the rotation slot 108 when the key portion 46 is moved through the rotation slot 108 toward the retention slot 110. However, after the key portion 46 moves past the latch structure 112, the leaf spring profile of the latch structure 112 causes the latch structure 112 to spring back into place. Thus, as shown in FIG. 9C, if an attempt to remove the key portion 46 from the retention slot 110 is made, the key portion 46 engages the free end 114 of the latch structure 112, thereby causing the leaf spring profile to bow out toward the opposite wall of the rotation slot 108 and obstruct the rotation slot 108.

Figure 10A:
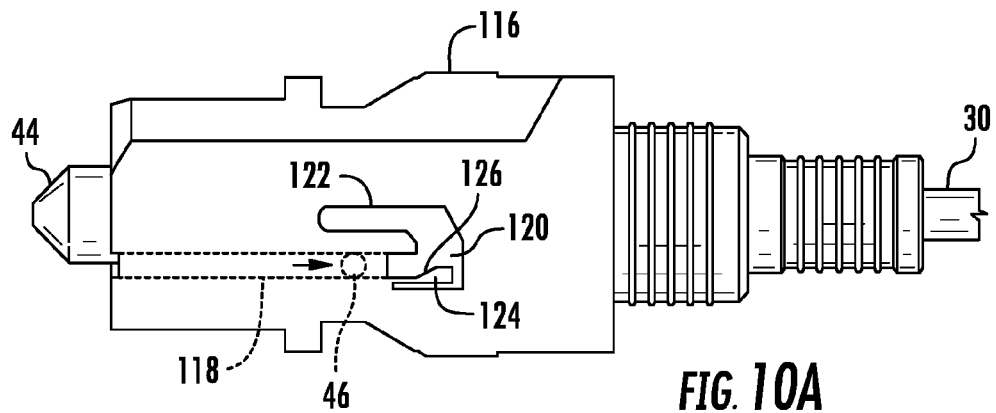
FIG. 10A-10C are side views of an inner housing sub-assembly according to an alternative embodiment showing insertion and retention of a ferrule holder within the inner housing sub-assembly employing an alternative latch feature for automatically locking and retaining the ferrule holder in the inner housing.
Figure 10B:
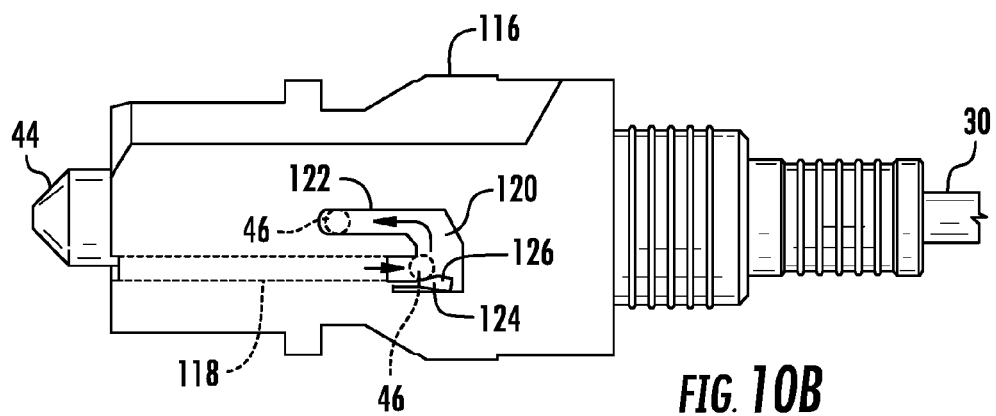
Figure 10C:
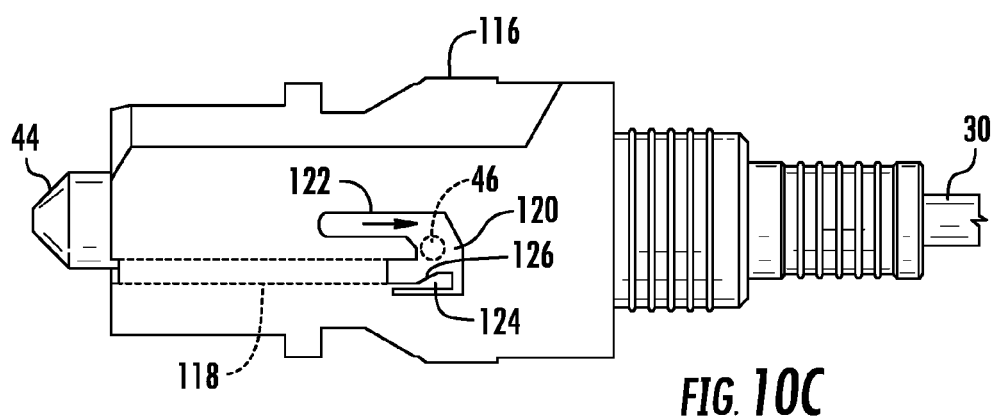

In some embodiments, the latch structure can obstruct the interface between the rotation slot and insertion slot. In this regard, FIGS. 10A-10C show another fiber optic inner housing sub-assembly 116 that includes a bayonet locking mechanism including an insertion slot 118, a rotation slot 120, and a retention slot 122 for accommodating a ferrule holder, such as ferrule holder 34 having key portions 46 and carrying ferrule 44. The fiber optic inner housing sub-assembly 116 also includes a latch structure 124 that extends along a portion of the insertion slot 118 into the rotation slot 120. As shown by FIGS. 10A and 10B, a ramped surface 126 of the latch structure 124 causes the latch structure 124 to press away from the key portion 46 during insertion into the rotation slot 120. As shown by FIG. 10C, the ramped surface 126 then obstructs the rotation slot 120 to impede movement of the key portion 46 out of the rotation slot 120 back into the insertion slot 118.

Figure 11A:
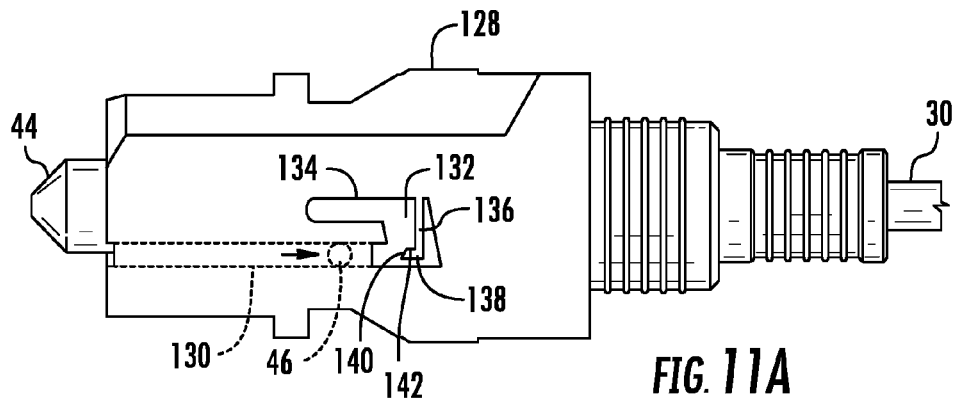
FIG. 11A-11C are side views of an inner housing sub-assembly according to an alternative embodiment showing insertion and retention of a ferrule holder within the inner housing sub-assembly employing an alternative latch feature for automatically locking and retaining the ferrule holder in the inner housing.
Figure 11B:
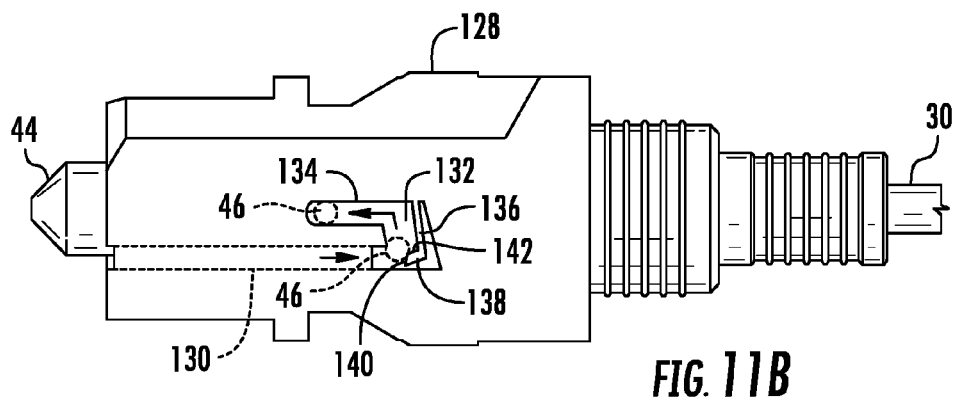
Figure 11C:
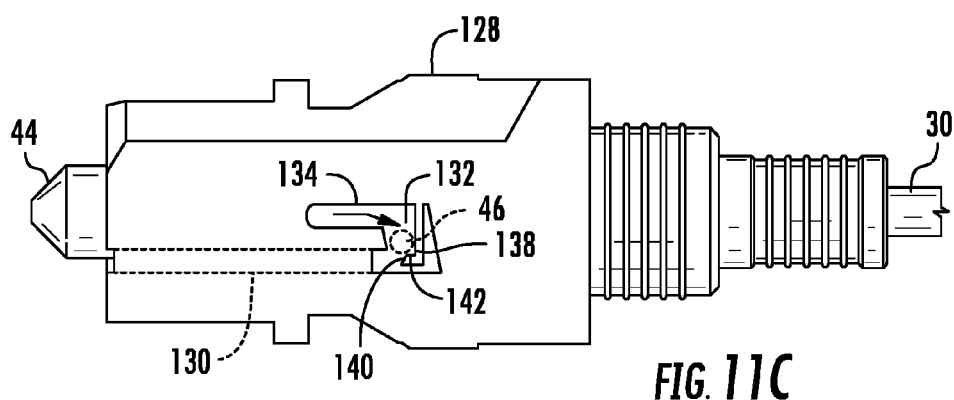

FIGS. 11A-11C show another fiber optic inner housing sub-assembly 128 that includes a bayonet locking mechanism including an insertion slot 130, a rotation slot 132, and a retention slot 134 for accommodating a ferrule holder, such as ferrule holder 34 having key portions 46 and carrying ferrule 44. In this embodiment, a latch structure 136 on the inner housing sub-assembly 128 extends within the rotation slot 132 to obstruct the key portion 46 from being moved from the rotation slot 132 to the insertion slot 130. As shown by FIGS. 11A and 11B, when the key portion 46 is inserted into the insertion slot 130, the key portion 46 engages a ramp surface 140 of a flange 138 disposed on the end of the latch structure 136. The latch structure 136 is pressed toward a rear of the rotation slot 132 while the ramp surface 140 guides and rotates the key portion 46 into the rotation slot 132, where it can then be rotated toward the retention slot 134 and released. However, as shown by FIG. 11C, when the key portion 46 is rotated back toward the insertion slot 130, the key portion 46 engages a side surface 142 of flange 138 and is prevented from rotating further. Thus, the flange 138 of the latch structure 136 permits movement of the key portion 46 into the rotation slot 132 for assembly while preventing removal of the key portion 46 from the rotation slot 132 into the insertion slot 130, thereby preventing accidental disassembly.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A fiber optic connector inner housing sub-assembly for mounting and retaining a ferrule holder as part of a fiber optic connector sub-assembly, comprising:
   an inner housing having an opening extending therethrough, wherein the opening comprises a front end, a rear end, and an interior surface; and
   at least one bayonet locking mechanism comprising:
      an insertion slot disposed in the interior surface of the opening and configured to receive a respective key portion of a ferrule holder when the ferrule holder is inserted into the front end of the opening;
      a rotation slot disposed in the interior surface of the opening for rotating the key portion of the ferrule holder away from the insertion slot; and
      a retention slot disposed in the interior surface of the opening for retaining the ferrule holder in the inner housing; and
      a latch extending into the rotation slot, wherein the latch is configured to permit movement of the key portion of the ferrule holder from the rotation slot into the retention slot, and to impede movement of the key portion of the ferrule holder from the retention slot into the rotation slot.

2. The fiber optic connector inner housing sub-assembly of claim 1, wherein the inner housing comprises a stop disposed at a front end of the retention slot to provide a stop surface for retaining the ferrule holder in the inner housing.

3. The fiber optic connector inner housing sub-assembly of claim 1, wherein the insertion slot is a groove extending substantially parallel to a longitudinal axis of the fiber optic connector inner housing.

4. The fiber optic connector inner housing sub-assembly of claim 3, wherein one of a portion of the rotation slot and a portion of the retention slot extends from the interior surface of the opening through an outer surface of the fiber optic connector inner housing.

5. The fiber optic connector inner housing sub-assembly of claim 1, wherein the retention slot extends substantially parallel to a longitudinal axis of the fiber optic connector inner housing.

6. The fiber optic connector inner housing sub-assembly of claim 1, wherein the rotation slot extends substantially perpendicular to a longitudinal axis of the fiber optic connector inner housing.

7. The fiber optic connector inner housing sub-assembly of claim 1, wherein the rotation slot includes a ramp surface configured to cause the key portion of the ferrule holder to rotate away from the insertion slot with respect to a longitudinal axis of the fiber optic connector inner housing when an insertion force parallel to the longitudinal axis is applied to the ferrule holder.

8. The fiber optic connector inner housing sub-assembly of claim 7, wherein the rotation slot includes a second ramp surface configured to cause the key portion of the ferrule holder to rotate the key portion toward the retention slot when a bias force parallel to the longitudinal axis in a direction opposite the direction of the insertion force is applied to the ferrule holder.

9. The fiber optic connector inner housing sub-assembly of claim 1, wherein the rotation slot includes a ramp surface configured to cause the key portion of the ferrule holder to rotate the key portion toward the retention slot with respect to a longitudinal axis of the inner housing toward the retention slot when a bias force parallel to the longitudinal axis is applied to the ferrule holder.

10. The fiber optic connector inner housing sub-assembly of claim 1, wherein the latch includes first and second substantially straight sections separated by a bend.

11. The fiber optic connector inner housing sub-assembly of claim 1, wherein the latch comprises a leaf-spring.

12. The fiber optic connector inner housing sub-assembly of claim 1, further comprising a crimp body connected to the inner housing at the rear end of the opening, wherein the inner housing is integrally formed with a crimp body at the rear end of the opening.

13. A fiber optic connector sub-assembly comprising:
    an inner housing sub-assembly comprising:
       an inner housing having an opening extending therethrough, wherein the opening comprises a front end, a rear end, and an interior surface;
       at least one bayonet locking mechanism comprising:
          an insertion slot disposed in the interior surface of the opening;
          a rotation slot disposed in the interior surface of the opening; and
          a retention slot disposed in the interior surface of the opening; and
       a bias member mounting portion disposed at the rear end of the opening;
    a ferrule holder disposed in the inner housing and having a key portion, the front end of the opening being configured to accommodate the ferrule holder; and
    a bias member disposed in the inner housing between the ferrule holder and the bias member mounting portion; and
    a latch extending into the rotation slot;
    wherein the insertion slot is configured to receive the key portion of the ferrule holder when the ferrule holder is inserted into the opening;
    wherein the rotation slot is configured to allow the ferrule holder to be rotated away from the insertion slot;
    wherein the bias member is configured to move the key portion of the ferrule holder into the retention slot when the ferrule holder is released, thereby retaining the ferrule holder in the inner housing; and
    wherein the latch is configured to permit movement of the key portion of the ferrule holder from the rotation slot into the retention slot, and to impede movement of the key portion of the ferrule holder from the retention slot into the rotation slot.

14. The fiber optic connector inner housing sub-assembly of claim 13, wherein the latch includes first and second substantially straight sections separated by a bend.

15. The fiber optic connector inner housing sub-assembly of claim 13, wherein the latch comprises a leaf-spring.

16. The fiber optic connector sub-assembly of claim 13, further comprising an optical fiber extending through a rear end of the ferrule holder and connected to a fiber optic ferrule mounted in the ferrule holder.

17. A method of assembling a fiber optic connector sub-assembly comprising:
    providing an inner housing sub-assembly comprising:
       an inner housing having an opening extending therethrough, wherein the opening comprises a front end, a rear end, and an interior surface;
       at least one bayonet locking mechanism comprising:
          an insertion slot disposed in the interior surface of the opening;
          a rotation slot disposed in the interior surface of the opening;
          a retention slot disposed in the interior surface of the opening; and a bias member mounting portion disposed at the rear end of the opening; and
a latch extending into the rotation slot;
providing a bias member in the inner housing adjacent the bias member mounting portion;
inserting the ferrule holder into the front end of the opening of the inner housing such that the key portion is received by the insertion slot and the bias member is disposed between the ferrule holder and the bias member mounting portion;
rotating the ferrule holder about a longitudinal axis of the opening such that the key portion rotates within the rotation slot; and
releasing the ferrule holder such that the bias member moves the key portion of the ferrule holder into the retention slot, thereby retaining the ferrule holder in the inner housing
wherein the latch is configured to permit movement of the key portion of the ferrule holder from the rotation slot into the retention slot, and to impede movement of the key portion of the ferrule holder from the retention slot into the rotation slot.

18. The method of claim 17, wherein:
inserting the ferrule holder into the front end of the opening comprises applying an insertion force to the ferrule holder in a first direction substantially parallel to the longitudinal axis of the inner housing; and
rotating the ferrule holder about the longitudinal axis comprises continuing to apply the insertion force in the first direction.

19. The method of claim 18, wherein the latch includes first and second substantially straight sections separated by a bend.

20. The method of claim 18, wherein the latch comprises a leaf-spring.

* * * * *